United States Patent Office 3,556,995
Patented Jan. 19, 1971

3,556,995
ASHLESS DISPERSANTS FOR MOTOR OILS
Richard J. Lee, Park Forest, Ill., and Robert E. Karll, Lake County, Ind., assignors to Standard Oil Company, Chicago, Ill., a corporation of Indiana
No Drawing. Continuation-in-part of application Ser. No. 686,841, Nov. 30, 1967. This application June 10, 1969, Ser. No. 831,980
Int. Cl. C10m 1/24, 1/32
U.S. Cl. 252—39
9 Claims

ABSTRACT OF THE DISCLOSURE

Disclosed is a composition prepared by (a) reacting an oil-soluble, hydrocarbon-substituted succinic acid anhydride and urea, thereby forming a first intermediate, (b) reacting the first intermediate and an alkylene polyamine having the formula $H_2N(\text{-alkylene-NH})_nH$ in which $n$ is an integer from 1 to 5 and "alkylene" is a saturated divalent hydrocarbon containing from about 2 to about 6 carbon atoms, thereby forming a second intermediate, and (c) reacting the second intermediate with a strong base. This composition is useful in keeping harmful materials suspended in motor oil, so that these materials will not interfere with the operation of an internal combustion engine.

RELATED APPLICATIONS

This application is a continuation-in-part of our co-pending application, U.S. Ser. No. 686,841, filed Nov. 30, 1967, and now abandoned.

BACKGROUND OF THE INVENTION

With prolonged engine operation crankcase lubricating oils lose their ability to protect metal engine surfaces as sludge, varnish formers, and corrosive substances accumulate in the oil. Dispersants, which suspend the sludge and varnish formers, and metal containing inhibitors, which counteract the corrosive substances, are added to lubricating oils. Dispersants and inhibitors should be compatible with each other, and preferably, they should enhance each other's performances. However, dispersants sometimes tend to interact physically or chemically with the inhibitors to form completed products that reduce the dispersing activity of the dispersants and the inhibiting activity of the inhibitors. Researchers are continually looking for dispersants which will maintain their activity and which will not impair the activity of the inhibitors.

DESCRIPTION OF THE INVENTION

We have discovered a novel composition which is used as a dispersant in motor oils. This composition, as described in the abstract, is best characterized by the way it is prepared, which is as follows: First, react a hydrocarbon-substituted succinic acid anhydride and urea, preferably using from about 0.5 to about 1.0 moles of the acid anhydride per mole of urea. The reaction mix is heated at a temperature desirably ranging between about 250 and 300° F. Heating is continued until water ceases to evolve, which usually requires from about 2 to about 4 hours of heating. The product derived is the first intermediate.

Next, react the first intermediate and an alkylene polyamine, preferably using from about 1.0 to about 2.0 moles of the first intermediate per mole of polyamine. This reaction mix is then heated at a temperature desirably ranging between about 200 and about 350° F. Heating is continued until ammonia ceases to evolve, which usually requires from about 2 to about 4 hours of heating. The product derived is the second intermediate.

Last, react the second intermediate with a strong base to produce the composition of our invention. The type or amount of base is not particularly critical, but of course, the base must be active in the second intermediate. Usually from about 1 to about 10 weight percent of base is used based on the weight of the second intermediate.

REAGENTS

The hydrocarbon substituent of the acid anhydride accounts for the oil solubility of the composition of our invention. This hydrocarbon substituent therefore must have a high enough molecular weight and sufficient chain branching to ensure oil solubility of the composition. This normally means that the hydrocarbon-substituted succinic acid anhydride is itself oil-soluble. Ordinarily, the hydrocarbon substituent has a molecular weight ranging between about 100 and about 10,000, and it is preferably derived from polyolefins having from 8 to 800 carbon atoms, for example, polymers of propene, 1-butene, 2-butene, methyl propene, 2-pentene, etc. The most preferred hydrocarbon substituents are polybutenyl or polypropenyl. Thus the preferred hydrocarbon-substituted succinic acid anhydride is polybutenyl or polypropenyl succinic acid anhydride.

Suitable alkylene polyamines generally come within the following formula:

$$H_2N(\text{-alkylene-NH})_nH$$

in which $n$ is an integer from about 1 to about 5, and "alkylene" is a saturated divalent hydrocarbon containing from about 2 to about 6 carbon atoms. The preferred alkylene polyamines are ethylene and propylene polyamines, the most preferred being tetraethylene pentamine. Other polyamines include, for example, butylene polyamines, and cylic homologues of such polyamines, for example, piperazines. Specific examples of alkylene polyamines are: ethylene diamine, diethylene triamine, tetraethylene pentamine, and N-2-aminoethyl-piperazine.

The strong base used is preferably soluble in the second intermediate. Suitable bases are metal hydrides such as calcium hydride; alkali metal alkoxides such as sodium methoxide, lithium methoxide, sodium ethoxide, lithium ethoxide, etc.; metal hydroxides such as sodium hydroxide, lithium hydroxide, calcium hydroxide, etc.; and alkali metal amides such as sodium amide, lithium amide, etc.

Motor oil

Also coming within the scope of our invention is a motor oil using the above-described compositions. Such a motor oil would have dissolved or dispersed therein from about 0.05 to about 70 weight percent, preferably 0.5 to 25 weight percent, of one or more of the compositions of our invention. Preferably, such as oil also contains from about 1 to about 3 weight percent of a "ZOP," a divalent metal salt of O,O-dihydrocarbyl ester of dithiophosphoric acid. For example, a zinc dialkyl dithiophosphate. These "ZOP" compounds serve as oxidation inhibitors, and are well known to those skilled in the art.

Example

First mix together 1.0 mole of polymer succinic anhydride (PSA) derived from a polymer having a molecular weight of about 850 and about 1.5 moles of urea. The PSA and urea are heated to a temperature within the range of about 250–300° F. with stirring for a time within the range of about 1–3 hours or until substantially all of the water of condensation is driven off. This produces the first intermediate which may be characterized as a polybutenyl succinimide derived from urea.

Next mix together and heat 1.0 mole of the first intermediate with 1.0 mole of tetraethylene pentamine. The temperature employed is within a range of from about 220–300° F., and heating time is within the range of from about 2–4 hours, or until substantially all of the ammonia is driven off. That is, until all of the ammonia formed in the condensation reaction is evolved. This produces the second intermediate which may be characterized as a polybutenyl succinimide derivative of a substituted urea.

Finally mix and heat the second reaction product with an amount of sodium methoxide within the range of from about a catalytic amount (1% by weight) to about 5% by weight of the sodium methoxide based upon the weight of the second intermediate. This mixture is heated to a temperature within the range of about 250–350° F. for a time period of from about 2–4 hours. This produces the dispersant of our invention. Preferably, this dispersant is filtered to remove the sodium probably present as a salt and other by-products of the reaction.

The polymer succinic anhydride utilized in the first reaction may be derived from a polybutene having a molecular weight within the range of from about 100 to about 10,000 and the polyalkylene polyamine may range from ethylenediamine up to about pentaethylenehexamine and mixtures of polyalkylenepolyamines may also be used. In addition to sodium methoxide other strong bases can be used in the reaction including, for example, lithium methoxide, lithium amide, or any other strong bases, preferably those which are soluble in the second intermediate. Examples of other compositions of this invention are prepared using the reagents mentioned above.

Ford-289 engine test

The Ford–289 cubic inch displacement engine test hereinafter designated as "F–289 Test" is a severe test with respect to both sludge and varnish formation and deposition. The F–289 Test is conducted with vapors from the crankcase being introduced into the engine fuel intake system by means of a positive crankcase ventilation (PVC) system which, in part, results in more severe sludge and varnish formation during test operation.

Briefly, this test designed to evaluate dispersancy characteristics of formulated lubricant oils consists of using the oil to be tested as a lubricant in a Ford–289 inch displacement engine under prescribed test conditions. Accordingly, five quarts of oil are placed in the crankcase and the engine is started and operated in accordance with the four-hour cycle shown below.

FORD-289 ENGINE OPERATING CYCLE

|  | Phase 1 | Phase 2 | Phase 3 |
|---|---|---|---|
| Duration | 45 minutes | 2 hours | 75 minutes. |
| Speed, r.p.m | 500 | 2,500 | 2,500. |
| Load | No load | (105 HP) | (105 HP). |
| Temperature, ° F.: | | | |
| Water out | 115 to 120 | 125 to 130 | 170 to 175. |
| Oil sump | 120 to 125 | 175 to 180 | 205 to 210. |
| A/F | 9.5±0.5 | 15.5±0.5 | 15.5±0.5 |

The four-hour cycle is reset a total of 48 times (192 hours running time). After each 16 hours of operation the engine is shut down for eight hours. Two-ounce samples of oil are taken every 30 hours and the oil level is adjusted with fresh oil to a level of five quarts. Added oil is weighed. At the time of the test, the hot oil is drained, weighed and recorded. The engine is then disassembled and tested for deposits of varnish and sludge among other observable results as set out in Table I below. A rating of 50 for total sludge and for total varnish is considered perfect; a rating of 60 percent or lower is considered passing for screen clogging; and a rating of 50 percent or lower is considered passing for ring plugging.

Formulation of novel additive

The novel ashless dispersant of this invention tested in the "F–289 Test" was present in an amount of about 3.74 weight percent which is the equivalent of about 5% of 40% additive. A high base calcium sulfonate with a total base number of about 300 was present in an amount of about 1.25 weight percent along with a zinc dithiophosphate (ZOP) oxidation inhibitor in an amount of about 1.0 weight percent. The three aforementioned additives were contained in about 94.01 weight percent of a readily commercially available S.A.E. 20 solvent extracted motor oil stock. The F–289 Test data were collected in tests utilizing the above enumerated formulation and on a commercial formulation for a comparison of results. These data collected appear in Table I below.

TABLE I.—F–289 ENGINE TEST (COMPARATIVE RESULTS)

|  | Commercially available formulation | Novel formulation |
|---|---|---|
| Sludge | 40 | 48 |
| Varnish | 40 | 39 |
| Oil ring plugging | 0 | 0 |

The above test results compare the performance of a highly efficient dispersant readily available in commerce with the novel ashless dispersant of this invention. Each dispersant is in a separate but similar motor oil formulation at equal concentrations, and the test demonstrates the surprising and superior result attained through the utilization of the novel dispersant of this invention. The exhibition of the superior result of the novel ashless dispersant occurred in the face of the severe sludge test inherent in the F–289 Engine Test utilizing the positive crankcase ventilation system.

We have described our invention in relation to preferred embodiments thereof, and have given many details for the purpose of illustration. It will however be apparent to those skilled in the art that our invention is susceptible to other embodiments and that many of the details set forth herein can be varied considerably without departing from the basic principles of our invention.

We claim:
1. A composition prepared by
   (a) reacting an oil-soluble hydrocarbon-substituted succinic acid anhydride and urea, thereby forming a first intermediate, said hydrocarbon substituent of the acid anhydride having a molecular weight ranging between about 100 and about 10,000,
   (b) reacting the first intermediate and an alkylene polyamine having the formula $H_2N$ (-alkylene-NH)$_n$H in which $n$ is an integer from 1 to 5 and "alkylene" is a saturated divalent hydrocarbon containing from about 2 to about 6 carbon atoms, thereby forming a second intermediate, and
   (c) reacting the second intermediate with a strong base including an alkali metal or alkaline earth metal component, said base being used in an amount ranging from about 1 to about 10 weight percent based on the weight of the second intermediate,
   (d) said composition being further characterized in that from about 0.5 to about 1.0 moles of the acid anhydried are used per mole of urea; and from about 1 to about 2 moles of the first intermediate are used per mole of alkylene polyamine.
2. The composition defined in claim 1 wherein step (a) is carried out at a sufficient temperature and for a sufficient time to remove substantially all the water produced in step (a), and steps (b) and (c) are carried out at a sufficient temperature and for a sufficient time to remove substantially all the ammonia produced in steps (b) and (c).
3. The composition defined in claim 1 wherein said hydrocarbon substituent is either polypropenyl or polybutenyl.
4. The composition defined in claim 1 wherein the strong base is a metal hydride, alkali metal alkoxide, metal hydroxide, or alkali metal amide.

5. A composition prepared by
  (a) reacting an oil-soluble polypropenyl or polybutenyl-substituted succinic acid anhydride and urea, thereby forming a first intermediate, said polypropenyl or polybutenyl substituent having a molecular weight ranging between about 100 and about 10,000,
  (b) reacting the first intermediate and an alkylene polyamine having the formula $H_2N(\text{-alkylene-NH})_nH$ in which $n$ is an integer from 1 to 5, thereby forming a second intermediate, and
  (c) reacting the second intermediate with a strong base including an alkali metal or alkaline earth metal component, said base being used in an amount ranging from about 1 to about 10 weight percent based on the weight of the second intermediate,
  (d) said composition being further characterized in that from about 0.5 to about 1.0 moles of the acid anhydride are used per mole of urea; and from about 1 to about 2 moles of the first intermediate are used per mole of alklene polyamine.

6. The composition comprising lubricating oil and from about 0.05 to about 70 weight percent of the reaction product prepared by
  (a) reacting an oil-soluble hydrocarbon-substituted succinic acid anhydried and urea, thereby forming a first intermediate, said hydrocarbon substituent of the acid anhydride having a molecular weight ranging between about 100 and about 10,000,
  (b) reacting the first intermediate and an alkylene polyamine having the formula $H_2N(\text{-alkylene-NT})_nH$ in which $n$ is an integer from 1 to 5 and "alkylene" is a saturated divalent hydrocarbon containing from about 2 to about 6 carbon atoms, thereby forming a second intermediate, and
  (c) reacting the second intermediate with a strong base including an alkali metal or alkaline earth metal component, said base being used in an amount ranging from about 1 to about 10 weight percent based on the weight of the second intermediate,
  (d) said reaction product being further characterized in that from about 0.5 to about 1.0 mole of the acid anhydride are used per mole of urea; and from about 1 to about 2 moles of the first intermediate are used per mole of alkylene polyamine.

7. The composition defined in claim 6 wherein step (a) is carried out at a sufficient temperature and for a sufficient time to remove substantially all the water produced in step (a), and steps (b) and (c) are carried out at a sufficient temperature and for a sufficient time to remove substantially all the ammonia produced in steps (b) and (c).

8. The composition defined in claim 6 wherein said hydrocarbon substituent is either polypropenyl or polybutenyl.

9. The composition defined in claim 6 wherein the strong base is a metal hydride, alkali metal alkoxide, metal hydroxide, or alkali metal amide.

References Cited

UNITED STATES PATENTS

| | | | |
|---|---|---|---|
| 3,219,666 | 11/1965 | Norman et al. | 252—51.5A |
| 3,220,949 | 11/1965 | Bell et al. | 252—51.5A |
| 3,247,110 | 4/1966 | Gee et al. | 252—39X |
| 3,280,034 | 10/1966 | Anzenberger et al. | 252—51.5A |
| 3,312,619 | 4/1967 | Vineyard | 252—51.5A |
| 3,346,493 | 10/1967 | Le Suer | 252—39X |

PATRICK P. GARVIN, Primary Examiner

W. J. SHINE, Assistant Examiner

U.S. Cl. X.R.

252—41, 51.5; 260—268, 309.6

PO-1050
(5/69)

UNITED STATES PATENT OFFICE
CERTIFICATE OF CORRECTION

Patent No. 3,556,995        Dated January 19, 1971

Inventor(s)   Richard J. Lee and Robert E. Karll

It is certified that error appears in the above-identified patent and that said Letters Patent are hereby corrected as shown below:

Column 1, line 46, the word "completed" should be --complexed--.

Column 2, line 55, the word "as" should be --an--.

Column 3, line 39, "(PVC)" should be --(pcv)--.

Column 3, Chart, "Load" should be --Load, Lbs.--.

Column 4, line 59, the word "anhydried" should be --anhydride--.

Column 5, line 31, "(-alkylene-NT)" should be --(-alkylene-NH)--.

Signed and sealed this 22nd day of June 1971.

(SEAL)
Attest:

EDWARD M. FLETCHER, JR.               WILLIAM E. SCHUYLER, JR.
Attesting Officer                       Commissioner of Patents